(12) United States Patent
Kim et al.

(10) Patent No.: US 8,271,907 B2
(45) Date of Patent: Sep. 18, 2012

(54) USER INTERFACE METHOD FOR MOBILE DEVICE AND MOBILE COMMUNICATION SYSTEM

(75) Inventors: Joo Min Kim, Seoul (KR); Dong Soo Shin, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 170 days.

(21) Appl. No.: 12/204,602

(22) Filed: Sep. 4, 2008

(65) Prior Publication Data
US 2009/0307631 A1 Dec. 10, 2009

Related U.S. Application Data

(60) Provisional application No. 61/025,326, filed on Feb. 1, 2008.

(30) Foreign Application Priority Data

Apr. 17, 2008 (KR) .................. 10-2008-0035585
Jul. 23, 2008 (KR) .................. 10-2008-0071593

(51) Int. Cl.
*G06F 3/048* (2006.01)
*G06F 3/041* (2006.01)

(52) U.S. Cl. ......... 715/863; 715/823; 715/810; 345/173

(58) Field of Classification Search .............. 715/810, 715/863; 345/173
See application file for complete search history.

(56) References Cited

U.S. PATENT DOCUMENTS

| | | | |
|---|---|---|---|
| 6,460,179 B1 | 10/2002 | Kretz et al. | |
| 6,580,442 B1 * | 6/2003 | Singh et al. | 715/840 |
| 7,158,123 B2 | 1/2007 | Myers et al. | |
| 7,577,925 B2 * | 8/2009 | Zotov et al. | 715/863 |
| 2002/0021308 A1 * | 2/2002 | White et al. | 345/800 |
| 2003/0014239 A1 * | 1/2003 | Ichbiah et al. | 704/7 |
| 2006/0123360 A1 * | 6/2006 | Anwar et al. | 715/810 |
| 2006/0227116 A1 * | 10/2006 | Zotov et al. | 345/173 |
| 2007/0146347 A1 * | 6/2007 | Rosenberg | 345/173 |
| 2007/0236476 A1 * | 10/2007 | Suzuki | 345/173 |
| 2008/0040692 A1 * | 2/2008 | Sunday et al. | 715/863 |

(Continued)

FOREIGN PATENT DOCUMENTS

KR 10-2000-0059621 B1 10/2000

(Continued)

OTHER PUBLICATIONS

Microsoft XP screen cap "MicrosoftXP.pdf",2007, 5 pages.*

*Primary Examiner* — Haoshian Shih
(74) *Attorney, Agent, or Firm* — Birch, Stewart, Kolasch & Birch, LLP

(57) ABSTRACT

A display device including a touch screen, and a corresponding user interface method including displaying a menu, including a plurality of menu elements, on the touch screen; detecting a first touch over one of the displayed menu elements, including detecting a corresponding first touch characteristic; and displaying, within the menu and in response to the first touch characteristic, a sub menu icon associated with the touched menu element. Also, a method including displaying a menu, including a plurality of menu elements, on the touch screen; detecting a first touch over one of the displayed menu elements, including detecting a corresponding first touch characteristic; and determining a user interface mode to be one of a shortcut create mode and a normal selection mode based on the first touch characteristic.

22 Claims, 17 Drawing Sheets

U.S. PATENT DOCUMENTS

| | | | |
|---|---|---|---|
| 2008/0062141 A1* | 3/2008 | Chandhri | 345/173 |
| 2008/0163119 A1* | 7/2008 | Kim et al. | 715/840 |
| 2009/0058820 A1* | 3/2009 | Hinckley | 345/173 |
| 2009/0132963 A1* | 5/2009 | Morita et al. | 715/834 |
| 2009/0172597 A1* | 7/2009 | Mercer | 715/840 |

FOREIGN PATENT DOCUMENTS

| | | |
|---|---|---|
| KR | 10-2002-0082510 A | 10/2002 |
| KR | 10-2006-0009706 A | 2/2006 |

* cited by examiner

USER INTERFACE METHOD FOR MOBILE DEVICE AND MOBILE COMMUNICATION SYSTEM

This application claims the benefit of U.S. Provisional Application No. 61/025,326, filed on Feb. 1, 2008, Korean Patent Application No. 10-2008-0035585, filed on Apr. 17, 2008, and Korean Patent Application No. 10-2008-0071593, filed on Jul. 23, 2008, all of which are hereby incorporated by reference as if fully set forth herein.

BACKGROUND OF THE INVENTION

1. Field of the Invention

The present invention relates to a user interface, and more particularly, to a user interface method of a mobile device and a mobile communication system, which are associated with a portable touch display device. Although the present invention is suitable for a wide scope of applications, it is particularly suitable for displaying shortcut sub menu icons, which correspond to sub menu elements associated with main menu elements selected within a main menu in accordance with a user interface mode based upon a user touch characteristic, thereby enabling the user to execute a wanted (or selected) element more easily and quickly.

2. Discussion of the Related Art

Recently, with the development of technology in electronics and telecommunications, devices providing a plurality of functions instead of one particular function are being developed. In using such devices, users may be able to use diverse interface tools that are fixed to the devices in order to allow aimed functions to be executed. If a user wishes to execute a particular function of a corresponding device, the user would require a navigation process for searching and selecting a corresponding element enabling the particular function to be executed by using an interface tool, such as an input button, a switch, a keyboard, a mouse, a trackball, a touch pad, a joystick, a touch screen, and so on. If the computer device has a plurality of functions, this navigation process would have to consist of relatively complex process steps.

For example, if a computer device provides main menu elements A, B, and C, each main menu element includes a plurality of sub menu elements. As shown in FIG. 1, the main menu element A includes sub menu elements A-1, A-2, and A-3 as lower menus. The main menu element B includes a sub menu element B-1, and the main menu element C includes sub menu elements C-1 and C-2. Subsequently, the sub menu element A-3 may include its lower menus A-3-1 and A-3-2.

As described above, when a computer device having a plurality of menu elements is operated by the user, the main menu elements A, B, and C are displayed onto a screen. If the user wishes to execute the function of A-3-2, which is a lower menu of the main menu element A, the user first uses the interface tool in order to select the main menu element A. Subsequently, when the main menu element A is selected, the sub menu elements A-1, A-2, and A-3 of the main menu element A are displayed. Thereafter, when the sub menu element A-3 is selected, the lower menus A-3-1 and A-3-2 are displayed. Therefore, by selecting the displayed element A-3-2, the user may execute the function of the corresponding element.

Meanwhile, if the user wishes to execute the sub menu element C-2 of the main menu element C while the A-3-2 element is being executed, the user moves back to the main screen where the main menu elements are displayed. Then, the user selects the main menu element C. Once the main menu element C is selected, the sub menu elements C-1 and C-2 of the main menu element C are displayed. Thereafter, by selecting the displayed element C-2, the user may execute the function of the corresponding element.

As described above, when the user wishes to execute one function from another from a computer device having multiple functions, the user must execute a complicated navigation process of having to sequentially select a plurality of elements in search of the element executing the corresponding function. This is inconvenient for the user and causes the user to consume an excessive amount of time in search for the corresponding element. Therefore, such complex navigation processes should be improved in order to provide the convenient and quick functions intended in mobile devices.

SUMMARY OF THE INVENTION

Accordingly, the present invention is directed to a computer program product and a user interface method of a mobile device and a mobile communication system that substantially obviate one or more problems due to limitations and disadvantages of the related art.

An object of the present invention is to provide a computer program product and a user interface method of a mobile device and a mobile communication system that can conveniently and quickly execute a selected function by displaying a shortcut sub menu icon, which corresponds to a sub menu element associated with a selected main menu element within the main menu, depending upon a user interface mode in accordance with a user touch characteristic.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a computer program product and a user interface method for a mobile device includes displaying a main menu including a plurality of main menu elements, detecting a first touch over one of the main menu elements that are displayed, determining a user interface mode based on a touch characteristic of the detected first touch, and displaying a shortcut sub menu icon associated with the selected main menu element within the main menu when the user interface mode is determined to be a shortcut create mode, wherein the shortcut sub menu icon represents a sub menu element associated with the selected main menu element.

In another aspect of the present invention, a computer program product and a user interface method for a mobile device includes displaying a main menu including a plurality of main menu elements, detecting a first touch over one of the main menu elements that are displayed, determining a user interface mode based on a touch characteristic of the detected first touch, and displaying a plurality of shortcut sub menu icons associated with the selected main menu element on the touch screen when the user interface mode is determined to be a shortcut create mode, wherein the shortcut sub menu icons represent sub menu elements which are previously executed by a user in association with the selected main menu element, and the shortcut sub menu icons are displayed in a predetermined order.

In a further aspect of the present, a mobile communication system includes a display device adapted to display a graphical user interface, a touch screen positioned over the display device to detect touches that occur over the display device, and a processor operatively coupled to the display device and the touch screen, the processor displaying a main menu including a plurality of main menu elements on the display device, detecting a touch over one of the main menu elements, determining a user interface mode based on a touch characteristic of the detected touch, displaying a shortcut sub menu icon associated with the selected menu element within the main menu when the user interface mode is determined to be a short create mode, wherein the shortcut sub menu icon represents a sub menu element which is previously selected by a user in association with the selected main menu element.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
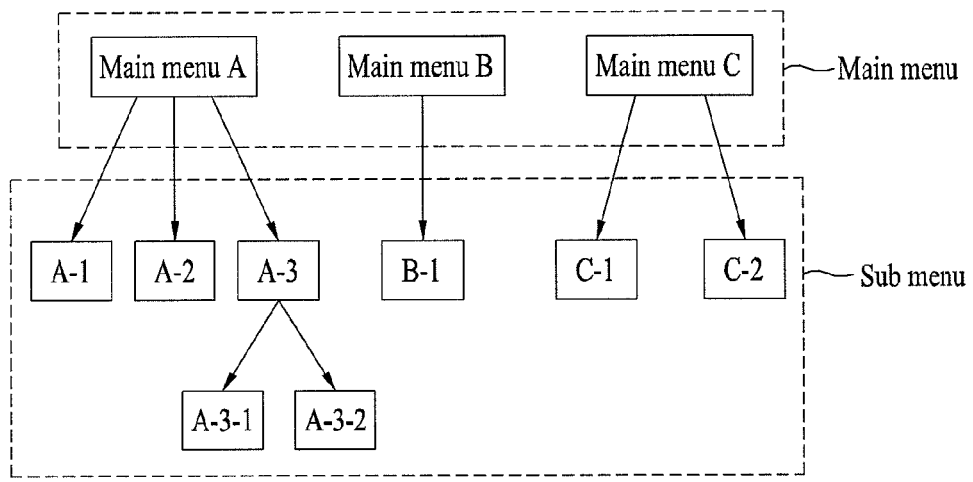
FIG. 1 illustrates a navigation process in a general computer device.
Figure 2:
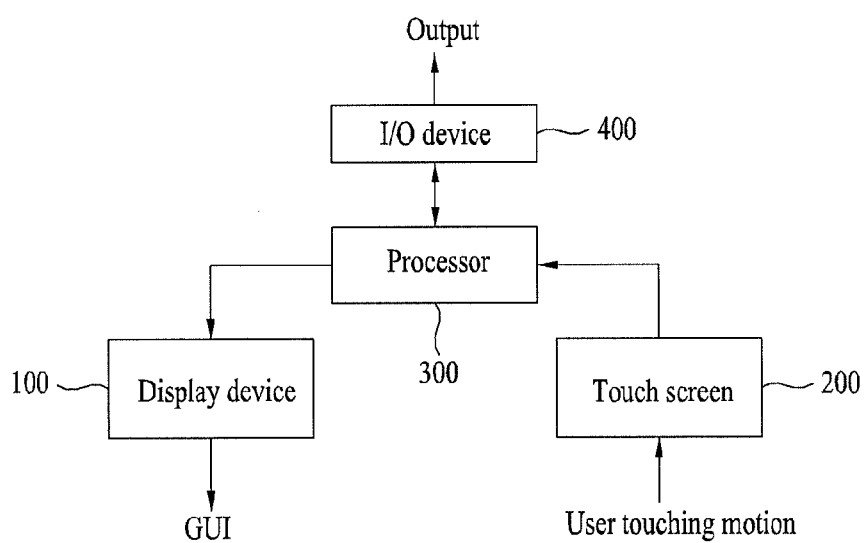
FIG. 2 illustrates a block view showing a mobile device according to the present invention.

The display device of the present invention may be a mobile device or another display device. FIG. 2 illustrates a block view showing a mobile device according to the present invention. The mobile device according to the present invention may include all types of hand-held based wireless communication devices, such as portable devices and international mobile telecommunication-2000 (IMT-2000) devices, which provide international roaming services and extended mobile telecommunication services. Herein, the portable devices may include portable devices with communication functions (i.e., personal digital cellular (PDC) phones, personal communication service (PCS) phones, personal handyphone system (PHS) phones, CDMA-2000 (1X and 3X) phones, dual band/dual mode phones, global standard for mobile (GSM) phones, mobile broadband system (MBS) phones, digital multimedia broadcasting (DMB) phones, smart phones, mobile phones, and so on), personal digital assistants (PDAs), hand-held PCs, notebook computers, laptop computers, WiBro terminals, MP3 players, MD players, and so on. The device may include a camera, or may be a camera.

As shown in FIG. 2, the mobile device according to the present invention broadly includes a display device 100, a touch screen 200, and a processor 300. Herein, a liquid crystal display (LCD) including an active matrix mode and a passive matrix mode, a plasma display panel (PDP), a light emitting diode (LED), an organic light emitting diode (OLED), and so on, may be used as the display device 100. Also, the display device 100 may consist of a monitor such as a monochrome display, a color graphics adapter (CGA), an enhanced graphics adapter (EGA), a variable graphics array (VGA), a cathode ray tube (CRT), and so on. Furthermore, the display device 100 is electrically connected to the processor 300 and operated accordingly. The display device 100 may display a graphical user interface in order to facilitate the performance of a user interface between the user and an execution program.

Herein, the graphic user interface may be expressed (or represented) in the form of a program or file having a variety of graphic images. More specifically, the graphic images may include windows, fields, dialog boxes, menus, icons, buttons, cursors, scroll bars, and so on. And, such graphic images may be aligned in a predetermined area and may also be created to best fit a specific user operation. Therefore, the user may select and activate such graphic images, thereby initializing the functions or operations associated with the selected and activated graphic images. For example, the user may select a particular button, thereby opening, closing, maximizing, or minimizing a window. The user may also select a specific icon in order to start a particular program.

Meanwhile, as a type of input device, the touch screen 200 may be positioned on the surface of the display device 100 or over the display device 100. Herein, the touch screen 200 may either be created as a single body with the display device 100 or be formed as a separate part that can be detached from the display device 100. Unlike other display devices, the touch screen 200 may provide an environment in which the user may uses his or her fingers in order to conveniently manipulate the graphic user interface. The touch screen 200 may consist of a plurality of layers including transparent electrode glasses and transparent electrode films, which are specially treated so as to be capable of detecting signals inputted by the user. The touch screen 200 also includes a position detection sensor that can detect a contacted position, when a finger or pen contacts the surface of the touch screen 200. Depending upon the detection method, the touch screen 200 may be categorized into a capacitive overlay type, a resistive overlay type, an infrared beam sensitive type, an integral strain gauge type, a surface acoustic wave transmission type, a piezo electric type. Herein, various types of touch screens may be applied in the present invention.

Additionally, the touch screen 200 may correspond to a screen having am close sensing system. Herein, the close sensing system refers to a system that can sense the motion of an object (i.e., the user's finger or a stylus pen) approaching within a predetermined range from the upper surface of the screen (i.e., sensing surface) in a upper-to-lower direction (hereinafter referred to as a "sensing field"). The close sensing system may include a capacitance system, an infrared system, and an image sensing system. Herein, the capacitance system detects (or senses) a change in capacitance. The infrared system emits infrared light and detects the infrared light rays reflected by the object. And, the image sensing system uses an image sensor to detect an approaching motion of the object.

In case of using the capacitance system, the approach of the object may be detected (or sensed) by sensing a change in the capacitance when the object approaches the sensing field. The capacitance detection type close sensing system may include a capacitance sensing circuit for measuring the change in the capacitance value, and a controller. In case of using the infrared system, not only the approach of the object but also the location of the object within the sensing surface may be detected by mounting an infrared light emitter and an infrared light receiver array around the sensing surface. When using the infrared system, the range of the sensing field may be relatively broader than the capacitance system. Finally, in case of using the image sensing system, the approach of the object as well as the movement of the object may be recognized by filming the image of the object using an image sensor, such as a CMOS sensor, and by processing the filmed image. When using the image sensing system, the range of the sensing field is not limited. Nevertheless, the range may be adjusted when required.

Figure 8A:
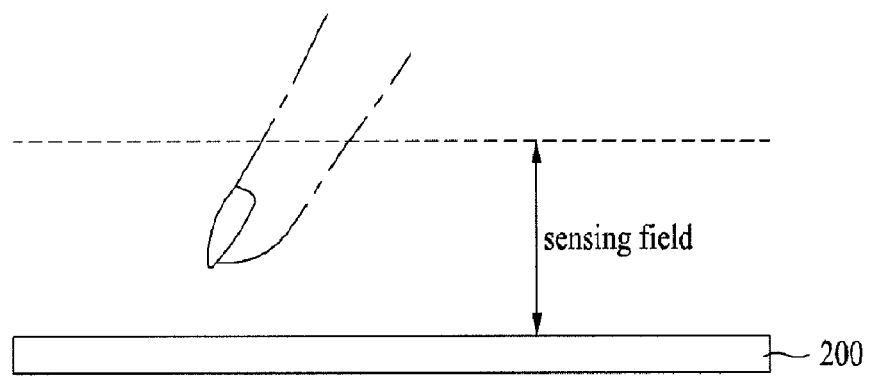
FIG. 8A and FIG. 8B illustrate the operations of a touch screen having a close sensing system according to the present invention.
Figure 8B:
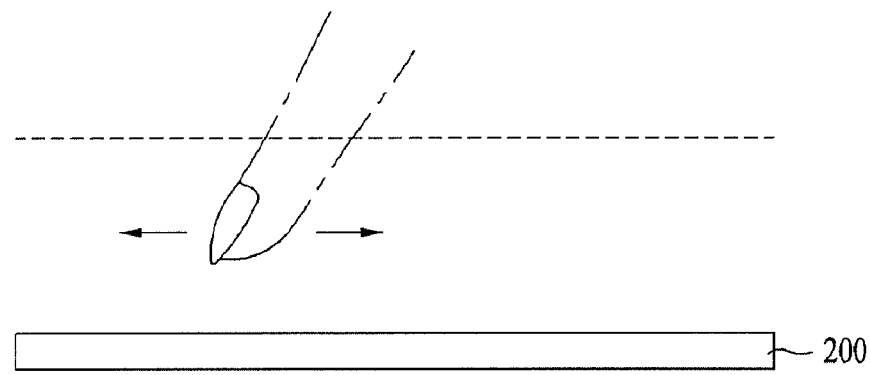

As described above, when using the touch screen 200 having the close sensing system, and when an object, such as the user's finger, approaches the sensing field without even touching the screen, as shown in FIG. 8A, the processor 300 may determine the approach as a touch, thereby performing the corresponding operations. Furthermore, when the object moves within the sensing field without touching the screen, as shown in FIG. 8B, the processor 300 may recognize the motion pattern of the object as an equivalent of the user actually touching the screen and moving his or her finger (i.e., a dragging motion).

Meanwhile, the processor 300 is coupled (or connected) to the display device 100 and the touch screen 200 and performs commands associated with the system, thereby controlling operations associated with the system. More specifically, the processor 300 may control data input/output between the display device 100 and the touch screen 200. For example, the processor 300 detects a signal inputted from the touch screen and analyzes a touch characteristic of the detected signal. Then, the processor 300 determines a user interface mode based upon a touch characteristic of the analyzed signal. Accordingly, the processor 300 may control the display device 100 so that a result corresponding to the corresponding mode is displayed on the display device 100. The processor 300 may consists of a single chip, a multiple chip, or a plurality of electric assembly parts. And, depending upon various system designs, dedicated processors that are specified for particular functions, embedded processors, single purpose processors, controllers, and application specific integrated circuits (ASIC) may be used as the processor 300. In addition, the processor 300 may process data through management programs, such as OS/2, DOS, Unix, Linux, Palm OS, and so on.

Furthermore, depending upon the system of the present invention, the mobile device may further include an input/output device 400. Herein, the input/output device 400 may correspond to peripheral device, such as a keyboard, a printer, a scanner, a camera, a speaker, and so on. Such input/output devices may be formed as a single body within the system or separately attached to the system. Such input/output devices 400 may either be wired to the system by using a cable or port, or be wirelessly connected to system using Ps/2, USB, IR, Bluetooth, and so on.

Figure 3A:
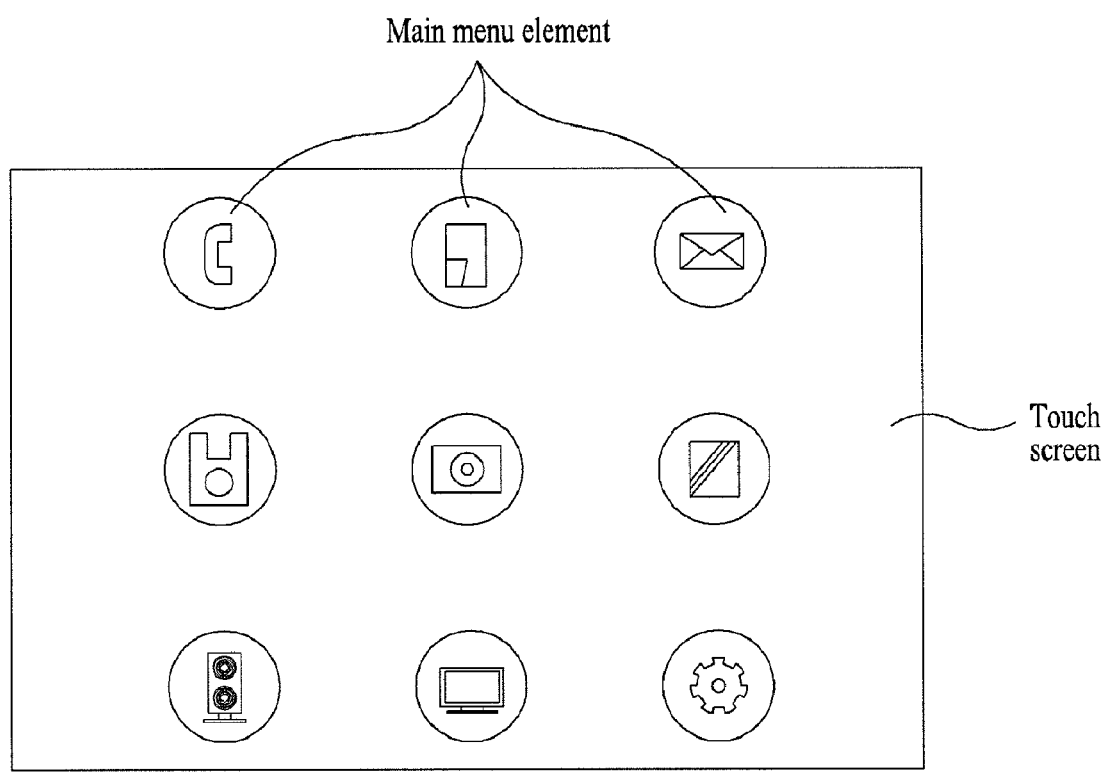
FIG. 3A to FIG. 3C illustrate a user interface method of a mobile terminal device according to an embodiment of the present invention.
Figure 3B:
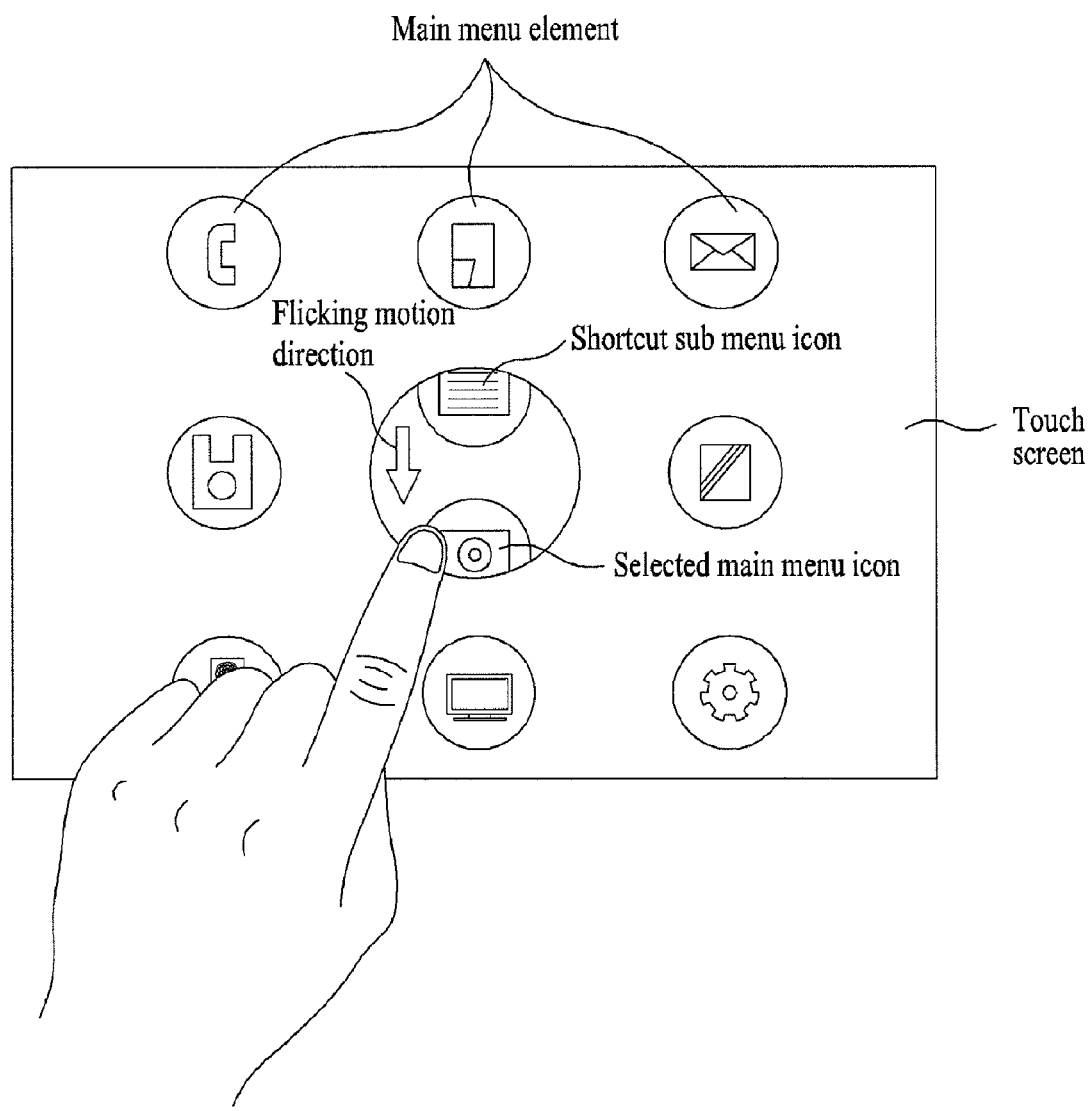
Figure 3C:
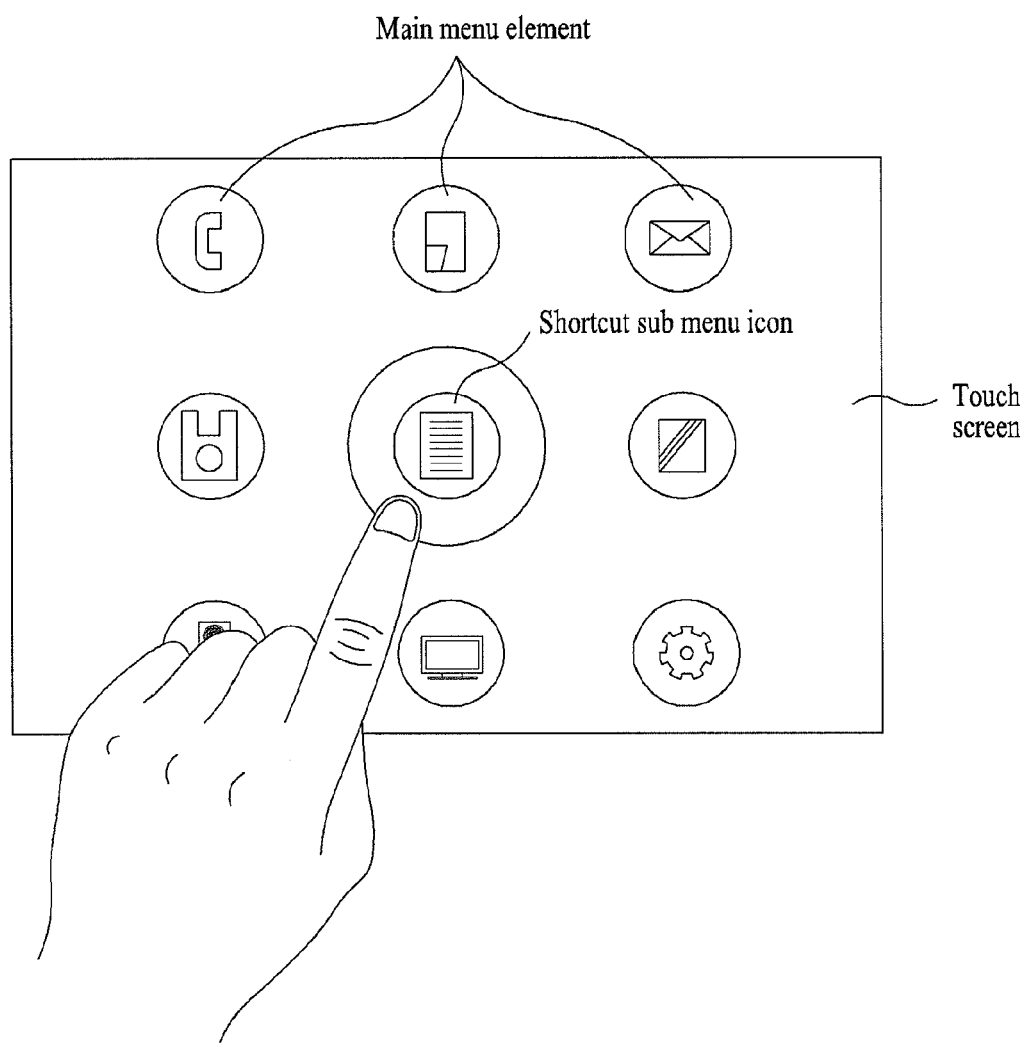

A user interface method of a mobile device according to the present invention having the above-described structure will now be described as follows. FIG. 3A to FIG. 3C illustrate a user interface method of a mobile terminal device according to an embodiment of the present invention. As shown in FIG. 3A, when the user first turns on the power in order to operate the mobile device, the processor of the mobile device displays a main menu including a plurality of main menu elements on the display device. Herein, the main menu corresponds to a home menu, which may be displayed on the display device depending upon a predetermined initialization information.

Subsequently, as shown in FIG. 3B, in order to select an element from the display main menu, the user places his or her finger over and touches a area of the touch screen when the corresponding element is positioned. Then, the processor detects the user's touch on the main menu element, thereby deciding the user interface mode based upon a touch characteristic of the detected touch. Herein, the processor may identify and detect two different types of touch characteristics. More specifically, one may correspond to a first touch characteristic for a shortcut icon create mode of the user interface mode, and the other may correspond to a second touch characteristic for a normal selection mode of the user interface mode. Therefore, the first touch characteristic and the second touch characteristic are preferably different from one another.

A normal selection mode is a selection mode that displays a menu and allows a user to execute a function associated with the touched menu element. A shortcut icon create mode is a selection mode that replaces or augments a menu with a sub menu icon associated with the touched menu item and along the lines discussed herein. The selection modes may selectable from a top level of a menu stack, and/or may be selectable from a sub menu of the menu stack.

For example, the first and second touch characteristics may include a flicking motion, a double tap motion, a single tap motion, and so on. First of all, when the first touch characteristic corresponds to a flicking motion, then the second touch characteristic may be set as a double tap motion or a single tap motion. Furthermore, when the first touch characteristic corresponds to a double tap motion, and the second touch characteristic may correspond to a single tap motion. Conversely, when the first touch characteristic corresponds to a single tap motion, the second touch characteristic may correspond to a double tap motion. As described above, the touch characteristic may diversely vary depending upon the system design. Meanwhile, when determining whether the first touch characteristic corresponds to a flicking motion, the processor requires a predetermined set of conditions.

Figure 4A:
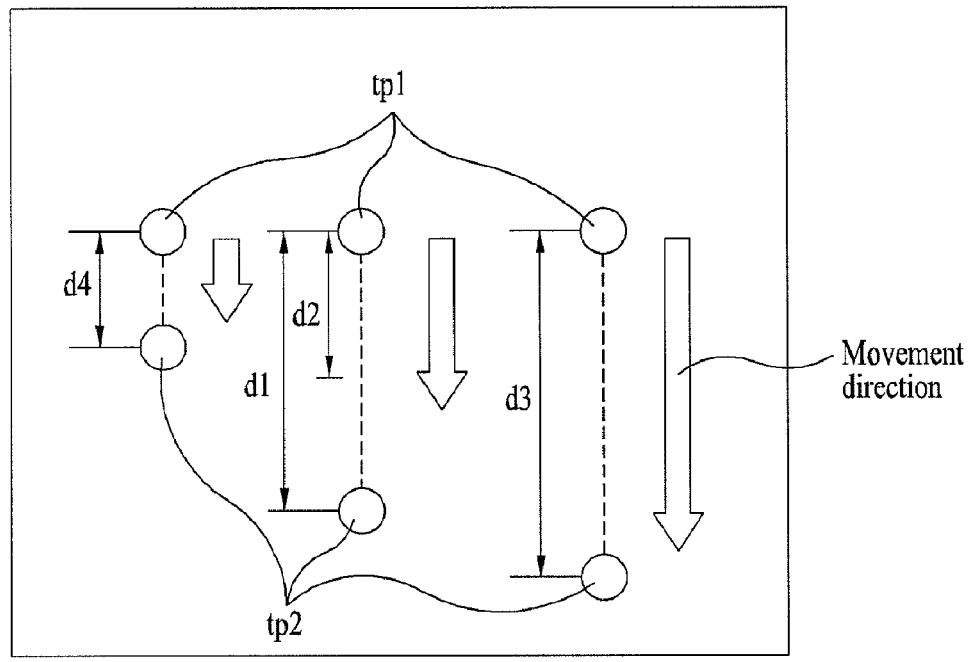
FIG. 4A and FIG. 4B illustrate touch characteristics of a flicking motion according to the present invention.
Figure 4B:
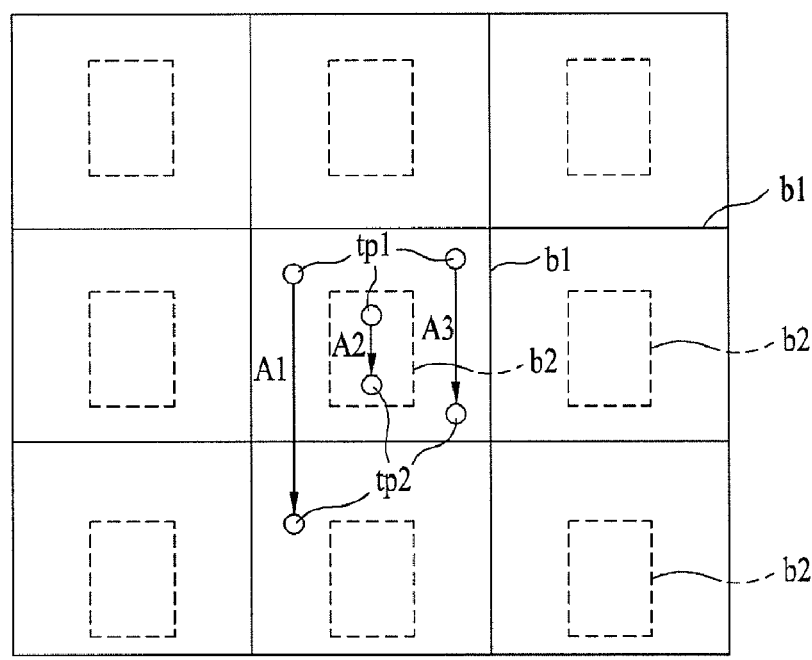

FIG. 4A and FIG. 4B illustrate touch characteristics of a flicking motion according to the present invention. The flicking motion according to the present invention refers to a touching motion consisting of the user's finger placed over and touching a specific area of the touch screen and then moving to a predetermined direction. Therefore, in order to enable the processor to detect the touch characteristic of the flicking motion, as shown in FIG. 4A, the processor measures a distance between a first touch point tp1 and a last touch point tp2. Then, when the measured motion distance is longer (or larger) than a first reference distance value d1 and shorter (or smaller) than a second reference distance value d2, the detected motion cannot be recognized as a flicking motion.

For example, as shown in FIG. 4A, when a motion distance between a first touch point tp1 and a last touch point tp2 corresponds to d3, the processor cannot recognize this touch motion as the flicking motion because d3 is longer than the first reference distance value d1. Also, when a motion distance between a first touch point tp1 and a last touch point tp2 corresponds to d4, the processor cannot recognize this touch motion as the flicking motion because d4 is shorter than the first reference distance value d2. As described above, the processor recognizes a touch motion as the flicking motion only when the measured motion distance is between the first reference distance and the second reference distance, thereby deciding the interface mode corresponding to the recognized flicking motion.

Alternatively, according to another embodiment of the present invention, as shown in FIG. 4B, the processor measures a movement area between a first touch point tp1 and a last touch point tp2. Then, when the measured movement area deviates from a first reference area b1, or when the measured movement area does not deviate from a second reference area b2 and remains within the range of the second reference area b2, the processor cannot recognize the detected touch as a flicking motion.

For example, as shown in FIG. 4B, when a movement area starting from a first touch point tp1 to a last touch point tp2 corresponds to A1, the processor cannot recognize the detected touch as the flicking motion because A1 deviates from the first reference area b1. Also, when a movement area starting from a first touch point tp1 to a last touch point tp2 corresponds to A2, the processor cannot recognize the detected touch as the flicking motion because A2 does not deviate from the second reference area b2 and exists within the range of area b2. In other words, the processor can recognize the detected touch as the flicking motion only when a movement area, such as area A3, exists within the range of the first reference area b1 and the second reference area b2. Accordingly, the processor can decide the interface mode corresponding to the recognized flicking motion.

Furthermore, the processor measures a movement speed between a first touch point tp1 and a last touch point tp2. Then, when the measured movement speed is greater (or higher) than a first reference speed, or when the measured movement speed is smaller (or lower) than a second reference area, the processor may not be able to recognize the detected touch as a flicking motion. Similarly, as described above, when the measured movement speed exists within the range of the first reference speed and the second reference speed, the processor can recognize the detected touch as the flicking motion, thereby deciding the interface mode corresponding to the recognized flicking motion.

Depending upon the speed value of the recognized flicking motion, the processor may decide the scroll speed of the selected main menu element and the associated shortcut sub menu icons. More specifically, the processor measures the speed of the user's flicking motion, so as to decide the display speed value of the selected main menu element and the associated shortcut sub menu icons based upon the measured speed. Thereafter, based upon the decided display speed value, the processor may perform a process of sequentially displaying shortcut sub menu icons associated with the selected main menu element once or repeat the same process several times. Then, after a predetermined lapse of time, at least one of the selected main menu element and shortcut sub menu icons may be displayed.

Figure 9:
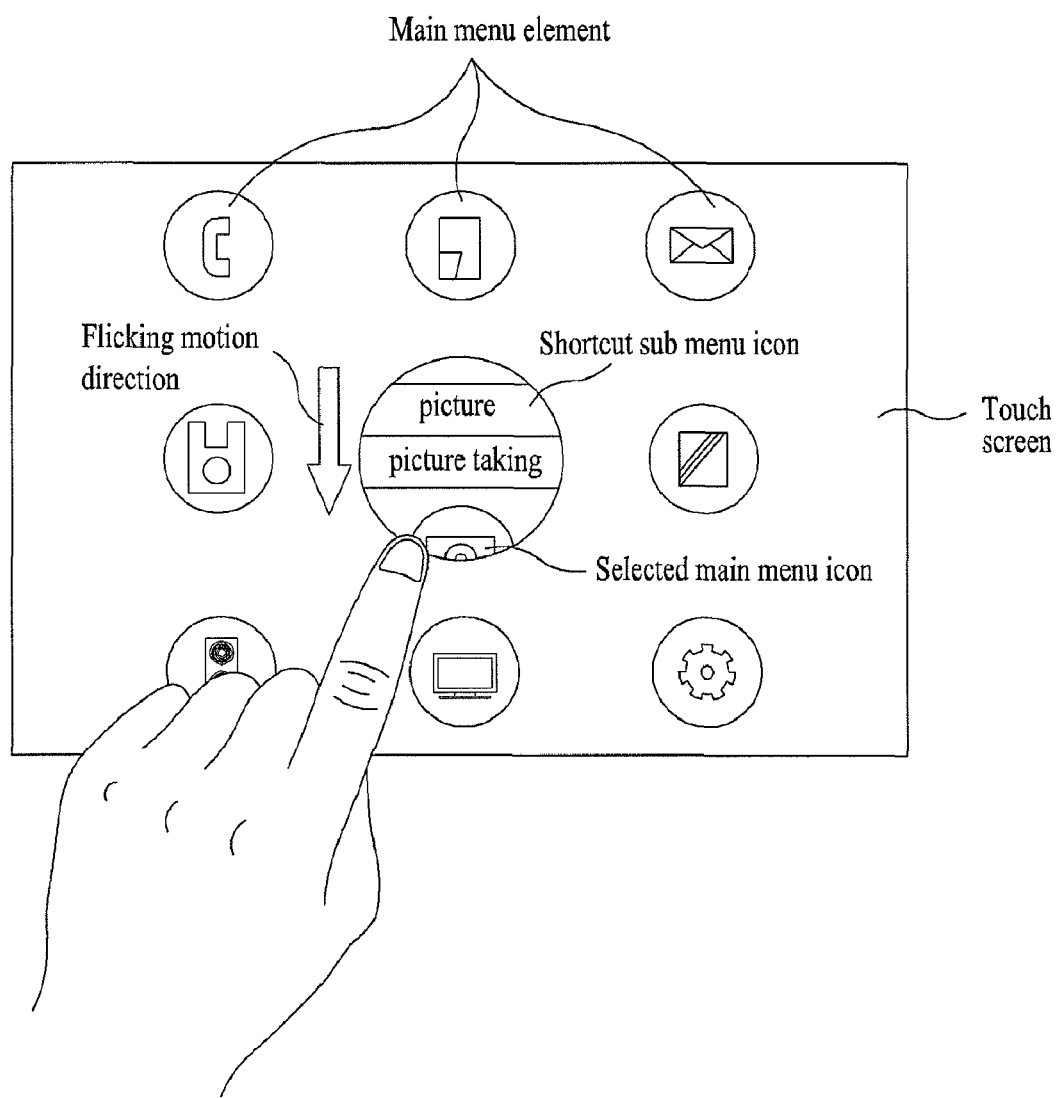
FIG. 9 illustrates a display format of a shortcut sub menu icons according to another embodiment of the present invention.

As described above, when reference values for a touch characteristic of a detected flicking is adequately predetermined and set, unnecessary operations for various touch error that may occur by the user during the usage of the system may be avoided, thereby enabling the system to accurately perform operations only when the user has correctly inputted the required flicking motion. Therefore, as shown in FIG. 3B, when the touch characteristic of the detected touch corresponds to a flicking motion, the processor decides a shortcut icon create mode as the user interface mode corresponding to the detected flicking motion. Thus, the user can scroll the selected main menu within the main menu area along the direction of the flicking motion. At this point, in the menu element area, a portion of the selected menu element and a portion of the shortcut sub menu icon may be displayed while the main menu element is being scrolled. Also, the present invention may expand and display the main menu, which is touched by the user, thereby enabling the user to perform flicking motions more conveniently. Furthermore, in addition to icons, the shortcut sub menu elements displayed in the present invention may be displayed in text formats, as shown in FIG. 9.

Additionally, the flicking motion of the user may move in one or more of a vertical direction, a horizontal directions, and a diagonal direction starting from the selected main menu element. The scrolling may occur in response to a flick-and-release or a flick-and-drag (i.e., a drag of a finger or a pen device.) The scrolling may a continuous scroll through icons or may be a scroll-and-stop, where the scrolling stops at every icon.

In other embodiments, the scrolling may be replaced by flashing, opening/closing an aperture; fading an icon; dissolving an icon or wiping/pushing an icon. In another embodiment, the device may vibrate or make an audible sound when a first icon is replaced with another icon, or when a menu changes.

Figure 5A:
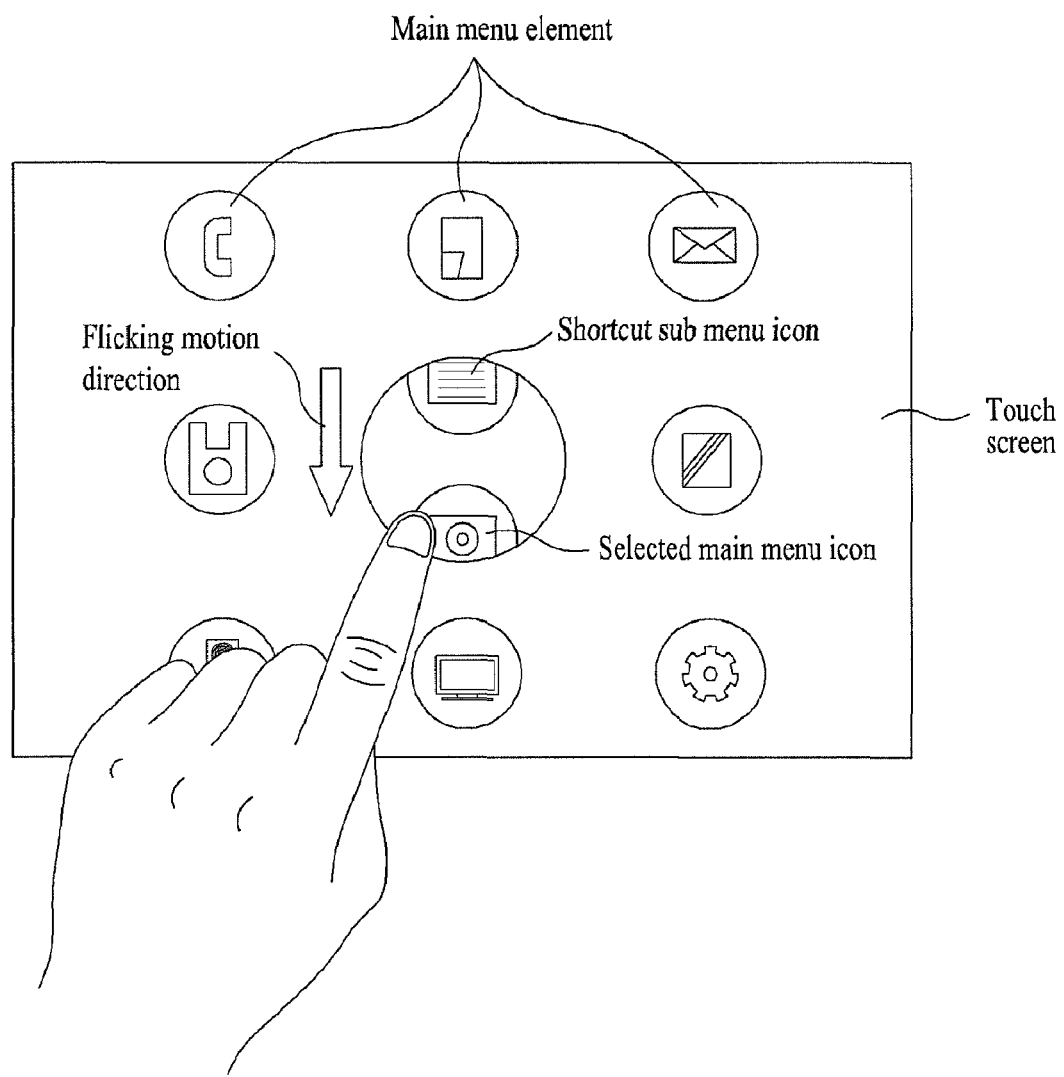
FIG. 5A to FIG. 5D illustrate flicking motion directions of the user and the respective shortcut sub menu icons according to the present invention.
Figure 5B:
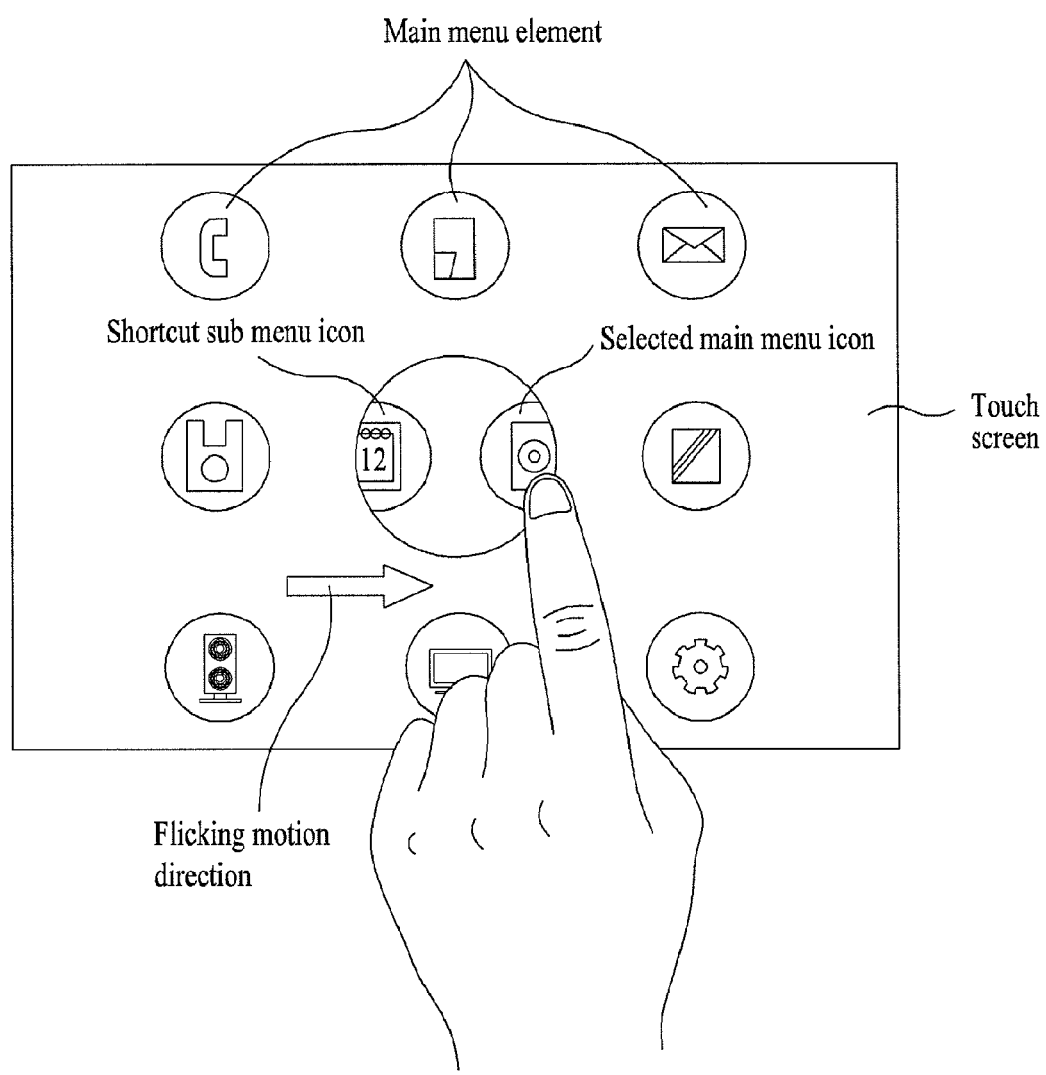
Figure 5C:
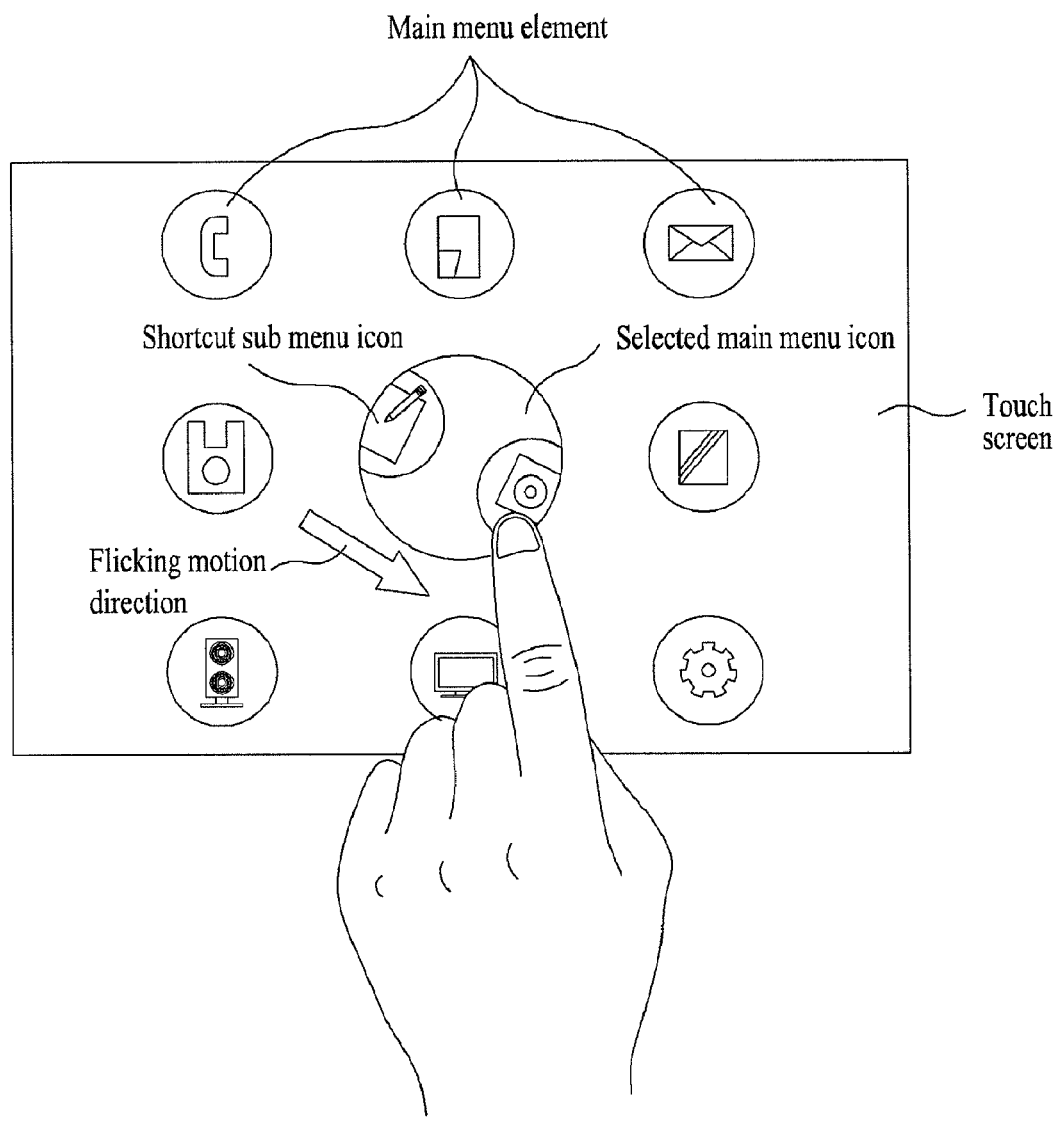
Figure 5D:
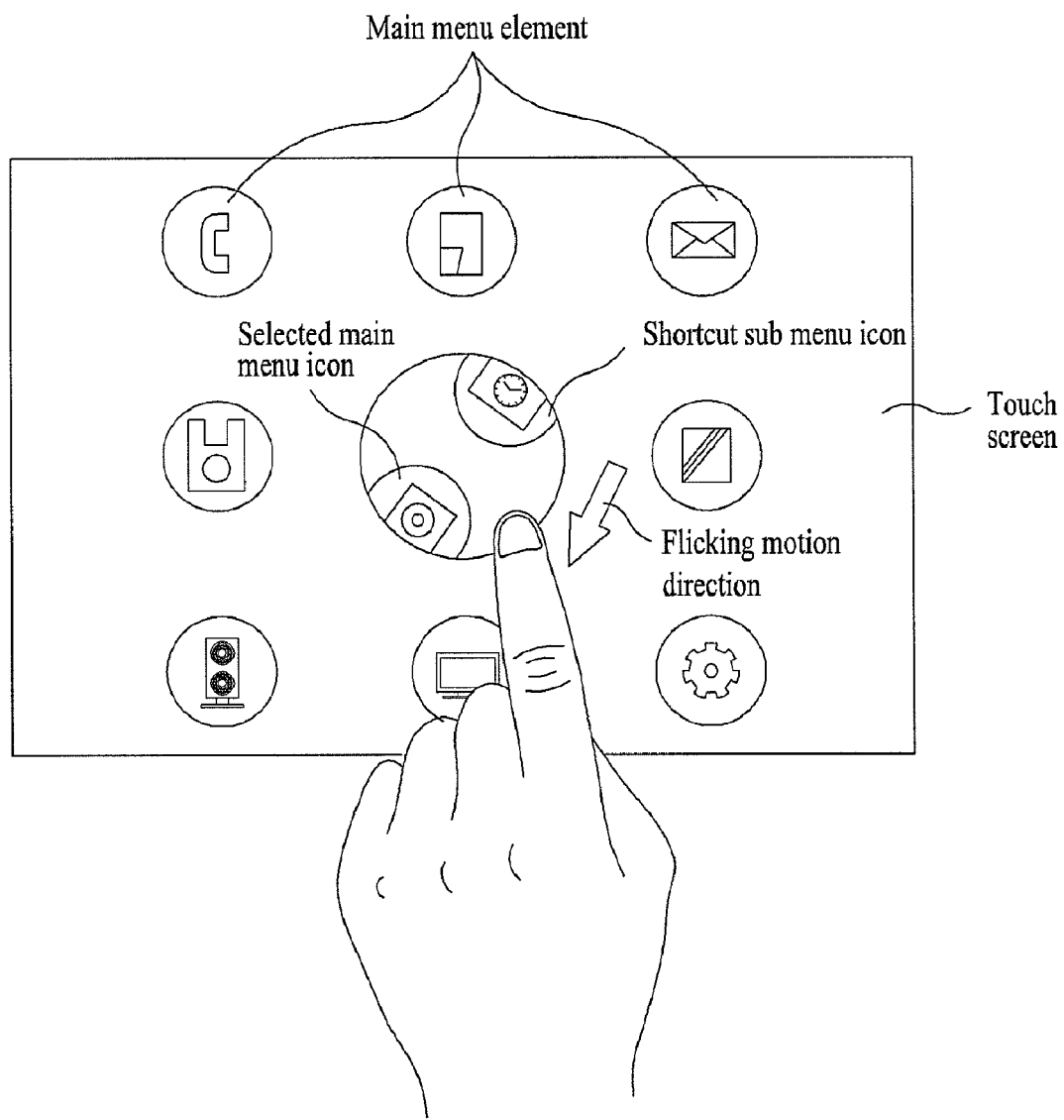

FIG. 5A to FIG. 5D illustrate flicking motion directions of the user and the respective shortcut sub menu icons according to the present invention. More specifically, FIG. 5A illustrates the user's flicking motion moving in a vertical direction (i.e., up-to-down direction). FIG. 5B illustrates the user's flicking motion moving in a horizontal direction (i.e., left-to-right direction). And, FIG. 5C and FIG. 5D illustrate the user's flicking motion moving in diagonal directions. Referring to FIG. 5A to FIG. 5D, different shortcut sub menu icons may be displayed depending upon the direction of the user's flicking motion.

For example, in case of the vertical moving direction of the flicking motion shown in FIG. 5A, a sub menu element previously selected by the user, in association with the selected main menu element, may be displayed as the shortcut sub menu icon. In case of the horizontal moving direction of the flicking motion shown in FIG. 5B, the sub menu element most frequently selected by the user may be displayed as the shortcut sub menu icon. In case of the diagonal moving direction (i.e., upper left-to-lower right direction) of the flicking motion shown in FIG. 5C, the sub menu element most recently selected by the user may be displayed as the shortcut sub menu icon. Finally, in case of the diagonal moving direction (i.e., upper right-to-lower left direction) of the flicking motion shown in FIG. 5D, the sub menu element most favored by the user may be displayed as the shortcut sub menu icon. In other words, the user's favorite sub menu element may be displayed as the shortcut sub menu icon.

As described above, when the shortcut icon create mode is decided as the user interface mode based upon the detected flicking motion, as shown in FIG. 3C, from the main menu, the shortcut sub menu icon, which is a sub menu element associated with the selected main menu element, is displayed on the selected menu area. Subsequently, when the user touches the shortcut sub menu icon, the processor detects the touch characteristic of the detected touch inputted by the user, so as to decide the user interface mode. Herein, the touch characteristic of the user's touch motion may correspond to a double tap motion or a single tap motion.

When the touch characteristic of the user's touch motion for the shortcut icon create mode corresponds to a flicking motion, the touch characteristic for the normal selection mode may correspond to a double tap motion or a single tap motion. Furthermore, if the touch characteristic of the user's touch motion for the shortcut icon create mode corresponds to a double tap motion, the touch characteristic for the normal selection mode may correspond to a single tap motion. And, if the touch characteristic of the user's touch motion for the shortcut icon create mode corresponds to a single tap motion, the touch characteristic for the normal selection mode may correspond to a double tap motion. Therefore, depending upon the touch characteristic, when the normal selection mode is decided as the user interface mode, the processor closes the displayed main menu and automatically executes an application associated with the shortcut sub menu icon.

In some cases, the processor may close the displayed main menu and display a sub menu including a plurality of sub menu elements associated with the selected main menu element. Meanwhile, as shown in FIG. 3C, the shortcut sub menu icon may replace a main menu element, thereby being displayed in the selected main menu area. Alternatively, the shortcut sub menu icon may be displayed around the selected main menu element, or the shortcut sub menu icon may be displayed by being superimposed over the displayed main menu.

Figure 6A:
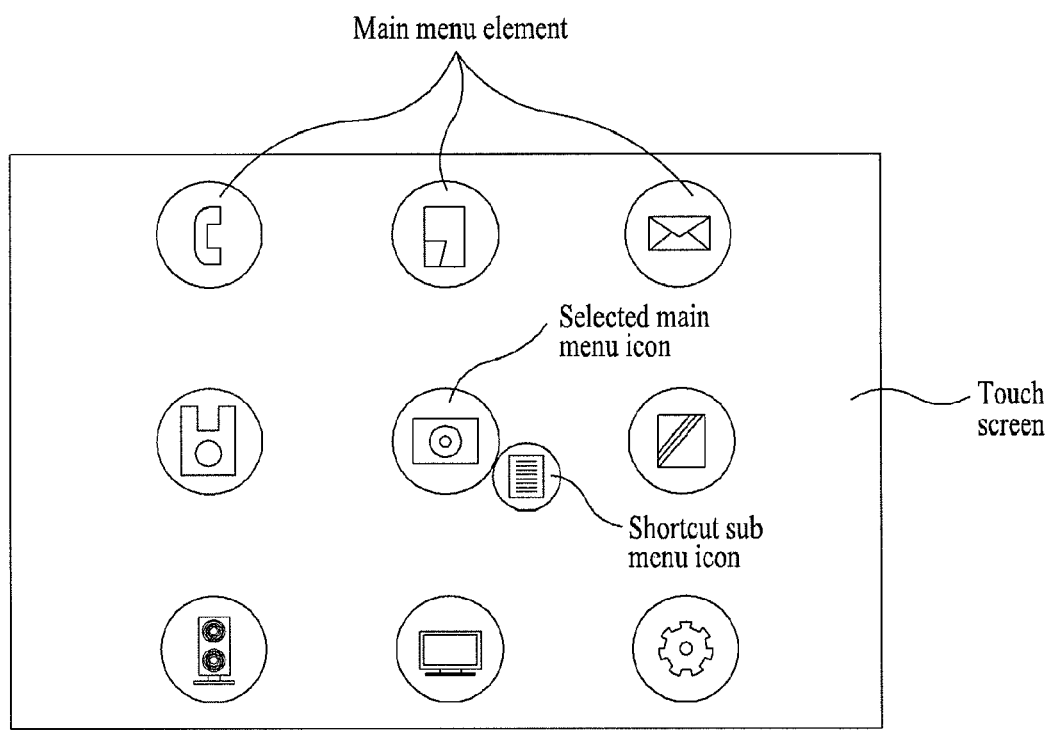
FIG. 6A to FIG. 6C illustrate display modes of the shortcut sub menu icons according to the present invention.
Figure 6B:
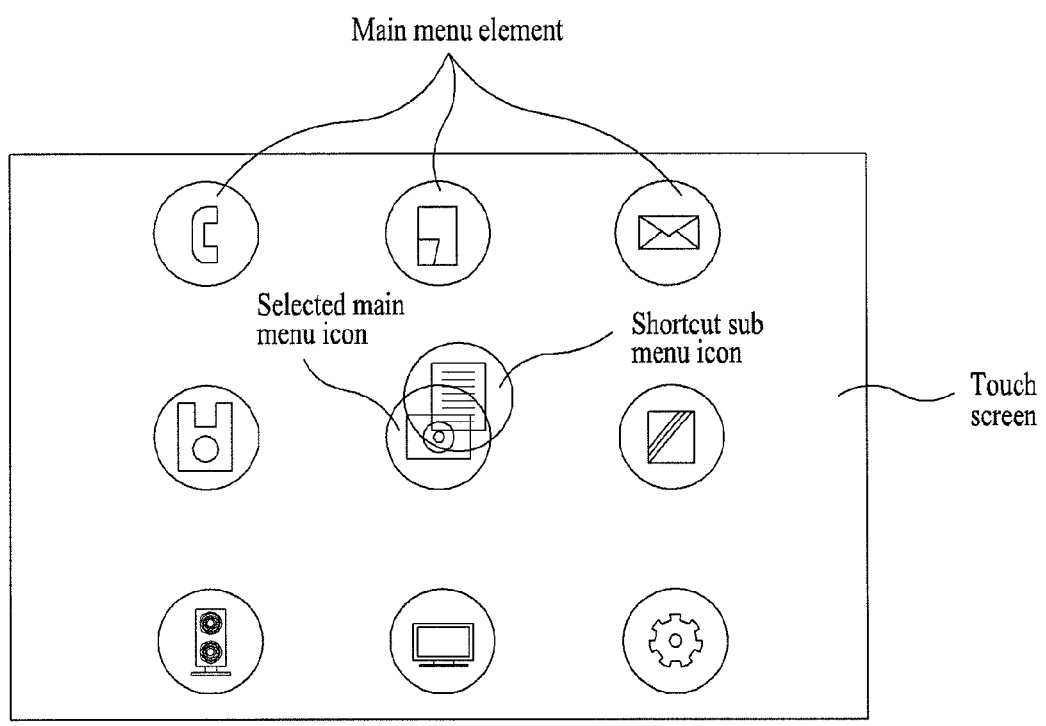

FIG. 6A and FIG. 6B illustrate display modes of the shortcut sub menu icons according to the present invention. More specifically, FIG. 6A illustrates an exemplary display mode of the shortcut sub menu icon being displayed around the selected main menu element. And, FIG. 6B illustrates an exemplary display mode of the shortcut sub menu icon being displayed by being superimposed over the displayed main menu. Referring to FIG. 6A, the shortcut sub menu icon is displayed around the selected main menu element. Therefore, the displayed shortcut sub menu icon may be displayed along with the selected main menu element. Herein, one shortcut sub menu icon or a plurality of shortcut sub menu icons may be displayed around the main menu element.

When a plurality of shortcut sub menu icons is displayed around the main menu element, each shortcut sub menu icon may be different from one another. In some case, in association with the selected main menu element, the shortcut sub menu icon may correspond to a sub menu element previously selected by the user, a sub menu element most frequently selected by the user, a sub menu element most recently selected by the user, or a sub menu element most favored by the user. And, at least one of these shortcut sub menu icons may be displayed around the selected main menu element. Also, as shown in FIG. 6B, the shortcut sub menu icon may superimpose over the displayed main menu and displayed along with selected main menu element.

Figure 6C:
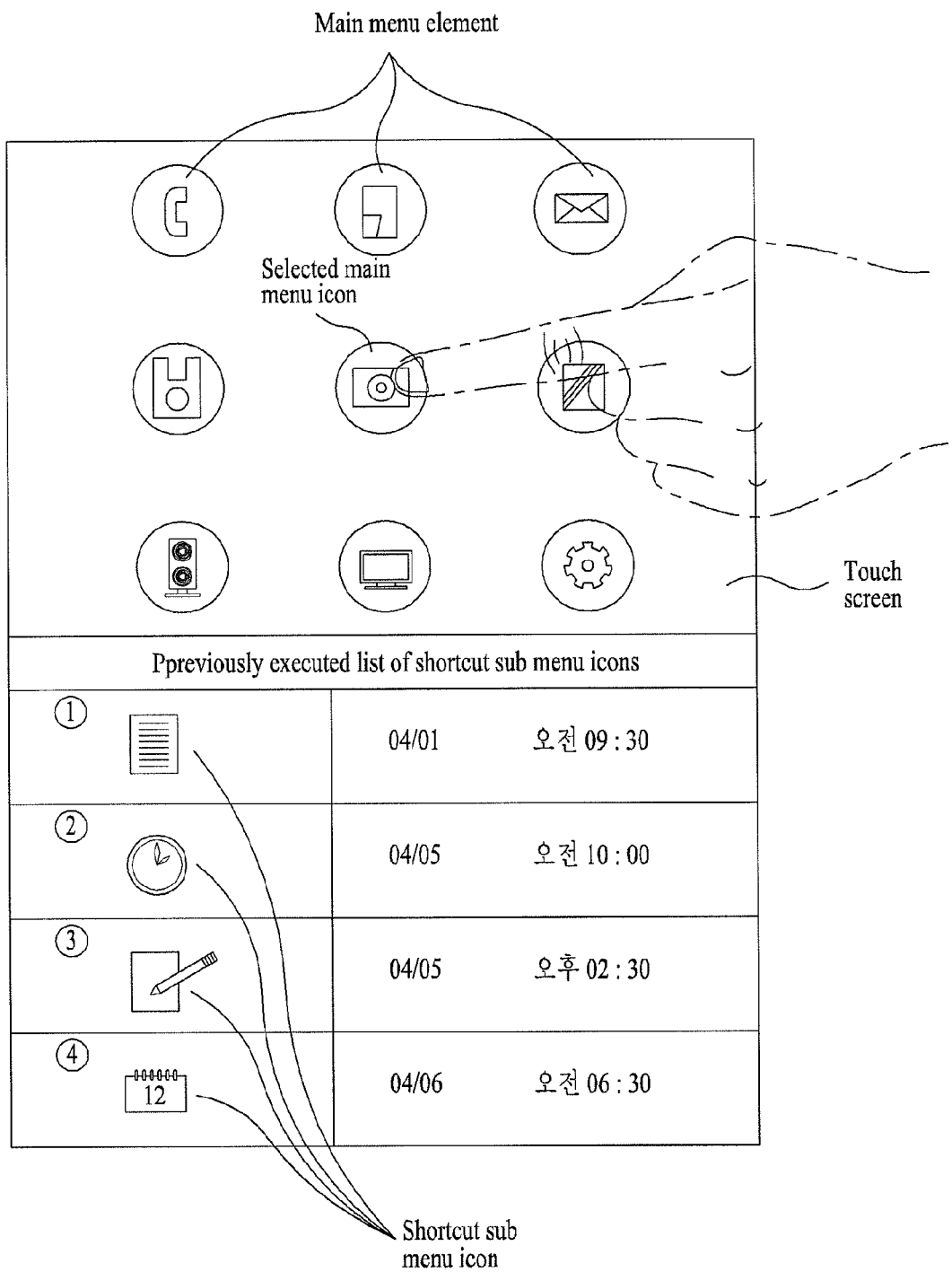

Furthermore, as shown in FIG. 6C, a plurality of shortcut sub menu icons may be displayed on a portion of the touch screen. Herein, the plurality of shortcut sub menu icons respectively corresponds to a plurality of sub menu elements that were previously executed by the user in association with the selected main menu icons. The list of the previously executed sub menu elements may be displayed on the touch screen in a time order starting from the most recently executed sub menu element. More specifically, referring to FIG. 6C, when a specific main menu is selected, a list of previously executed shortcut sub menu icons is displayed on a portion of the touch screen. In the list, the plurality of previously executed shortcut sub menu icons is aligned by order of the most recently performed shortcut sub menu icon.

Since the shortcut sub menu icons are displayed along with the selected main menu elements, the examples shown in FIG. 6A, FIG. 6B, and FIG. 6C are advantageous in that the user can quickly and easily recognize the displayed icons and elements at the same time, thereby enabling the related operations to be performed accurately. As described above, the shortcut sub menu icons according to the present invention may be independently displayed, without having other sub menus corresponding to the selected main menu elements displayed at the same time. Also, the shortcut sub menu icons according to the present invention may be displayed without executing or activating the selected main menu element. Furthermore, the shortcut sub menu icons according to the present invention may be displayed in an executable state. However, in some case, the shortcut sub menu icons may be displayed in a non-executable state.

Figure 7:
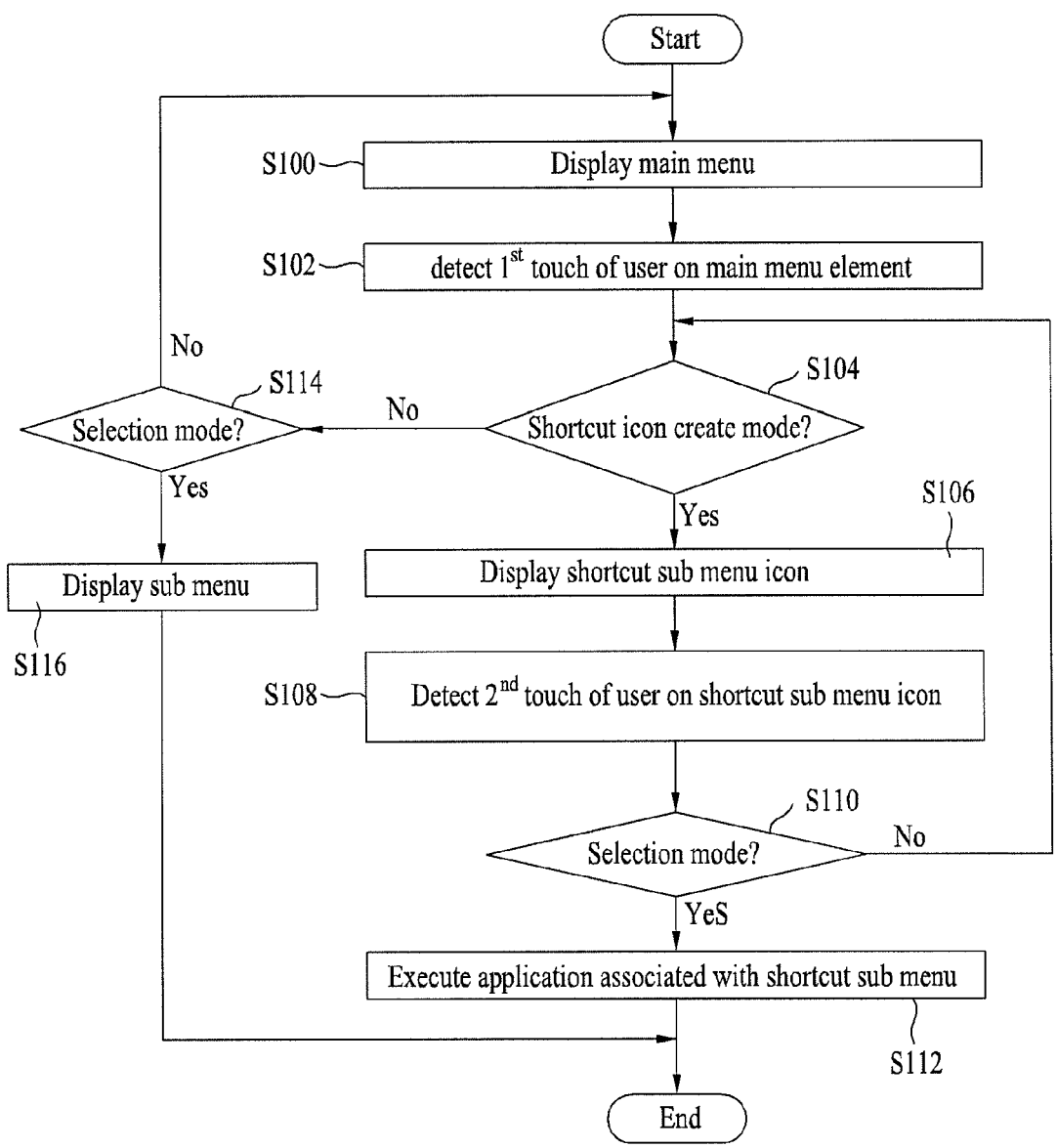
FIG. 7 illustrates a flow chart of the user interface method of a mobile terminal device according to an embodiment of the present invention.

FIG. 7 illustrates a flow chart of the user interface method of a mobile terminal device according to an embodiment of the present invention. When the user first turns on the power in order to operate the mobile device, the mobile device displays a main menu including a plurality of main menu elements on the display device 100 (S100). Subsequently, the processor 300 detects from the touch screen 200 a first touch inputted by the user for any one of the main menu elements displayed thereon (S102). Then, based upon the touch characteristic of the detected first touch, the processor 300 determines whether the user interface mode corresponds to the shortcut icon create mode (S104).

Thereafter, when the user interface mode corresponds to the shortcut icon create mode, the processor 300 displays at least one shortcut sub menu icon associated with the main menu element selected from the main menu on the display device 100 (S106). Then, the processor 300 detects from the touch screen 200 a second touch inputted by the user for the shortcut sub menu icon displayed thereon (S108). Subsequently, based upon the touch characteristic of the detected second touch, the processor 300 determines whether the user interface mode corresponds to a selection mode (S110).

Afterwards, if the user interface mode corresponds to the selection mode, the processor 300 automatically executes an application associated with the shortcut sub menu icon (S112). However, if the user interface mode does not correspond to the selection mode, the processor 300 repeats the process step of determining whether the user interface mode corresponds to a shortcut icon create mode. Meanwhile, if the user interface mode does not correspond to a shortcut icon create mode, the processor 300 determines whether the user interface mode based upon the touch characteristic of the user's first touch corresponds to a selection mode (S114). Finally, if the user interface mode is determined to be the selection mode, the processor 300 displays at least one sub menu associated with the main menu element selected from the main menu on the display device 100 (S116). However, if it is determined that the user interface mode does not correspond to the selection mode, the process step of displaying a main menu including a plurality of main menu elements is repeated.

The preceding modes of operation may be contingent upon a battery power level. That is, when battery power is below a predetermined threshold, the sub menu selection and/or scrolling may be disabled.

As described above, the present invention analyzes a touch characteristic of a user's touch motion and decides a user interface mode based upon the analyzed touch characteristic. Then, when the decided user interface mode corresponds to a shortcut icon create mode, a shortcut sub menu icon, which corresponds to a sub menu element associated with a main menu element selected from the main menu, is displayed, thereby enabling an element wanted by the user to be easily and quickly executed. The present invention may also be embodied and represented by using a random combination of computer programming software, firmware and/or hardware. Additionally, a computer programming code (software or firmware) according to the present invention is generally stored in at least one machine-readable storage medium, such as a semiconductor memory (e.g., a fixed (hard) drive, diskette, optical disc, magnetic tape, ROM, PROM, etc.), and related products may also be manufactured.

Moreover, manufactured products including the computer programming code may execute a direct code from the storage medium, or copy the computer programming code from the storage medium so as to store the copied code in a separate storage medium, such as a hard disc or a RAM. Alternatively, the computer programming code may also be transmitted through a network and used for remote execution. Furthermore, the method according to the present invention may be performed by combining at least one machine-readable storage medium including the code according to the present invention, while executing the code included within an adequate (or appropriate) standard computer hardware. The device according to the present invention may also correspond to at least one computer and memory system including or having a network access to a coded computer program according to the present invention.

Figure 10:
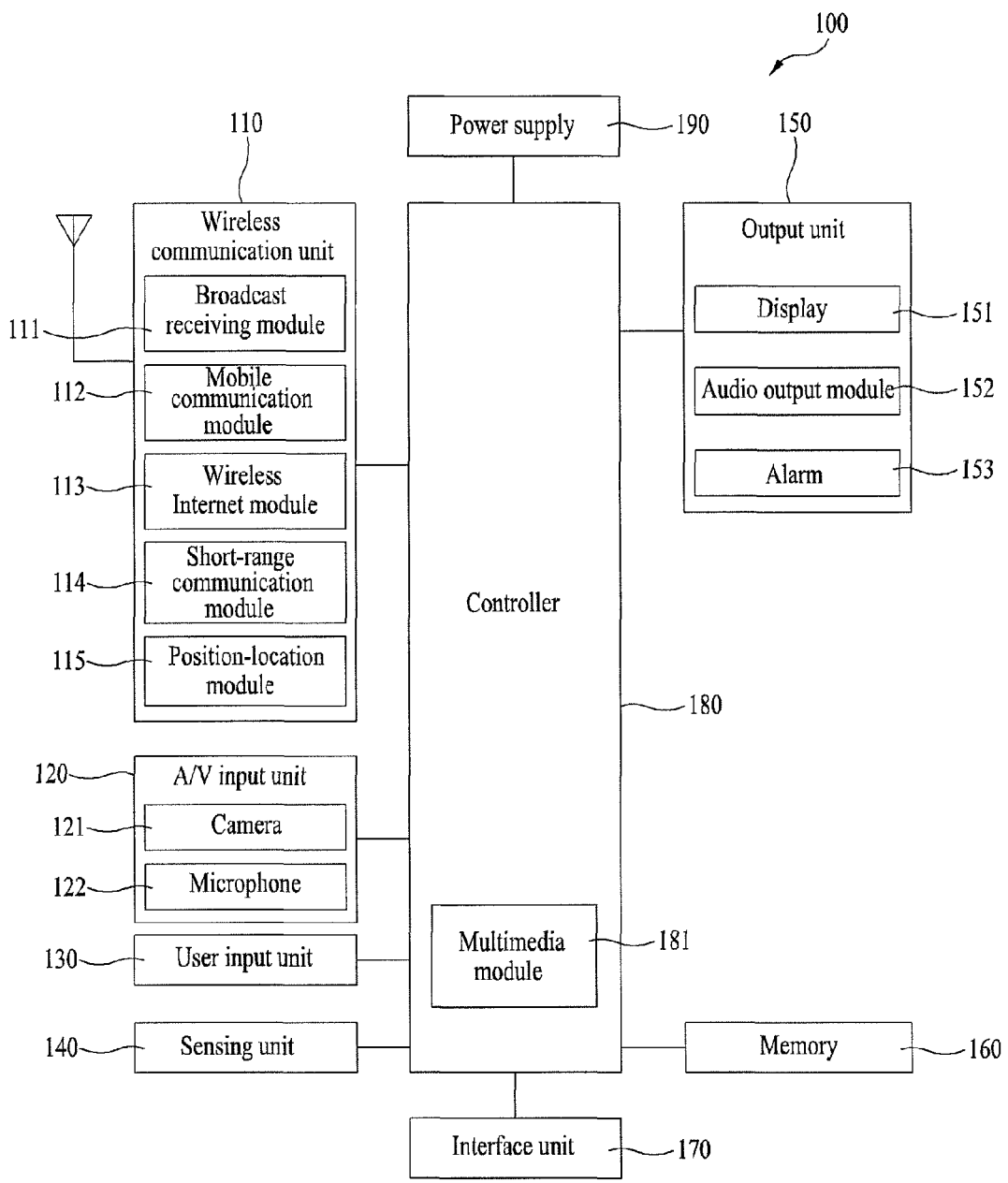
FIG. 10 is a block diagram of a mobile device in accordance with an embodiment of the present invention.

FIG. 10 shows a wireless communication unit 110 configured with several commonly implemented components. For instance, the wireless communication unit 110 typically includes one or more components which permits wireless communication between the mobile device 100 and a wireless communication system or network within which the mobile device is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile device. This module may be internally or externally coupled to the device.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile device. If desired, this module may be implemented using global positioning system (GPS) components which cooperate with associated satellites, network components, and combinations thereof.

Audio/video (A/V) input unit 120 is configured to provide audio or video signal input to the mobile device. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a touch screen panel, a jog wheel and a jog switch.

The sensing unit 140 provides status measurements of various aspects of the mobile device. For instance, the sensing unit may detect an open/close status of the mobile device, relative positioning of components (e.g., a display and keypad) of the mobile device, a change of position of the mobile device or a component of the mobile device, a presence or absence of user contact with the mobile device, orientation or acceleration/deceleration of the mobile device. The sensing unit 140 may comprise an inertia sensor for detecting movement or position of the mobile device such as a gyro sensor, an acceleration sensor etc. or a distance sensor for detecting or measuring the distance relationship between the user's body and the mobile device.

The interface unit 170 is often implemented to couple the mobile device with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile device. Display 151 is typically implemented to visually display information associated with the mobile device 100. For instance, if the mobile device is operating in a phone call mode, the display will generally provide a user interface or graphical user interface which includes information associated with placing, conducting, and terminating a phone call. As another example, if the mobile device 100 is in a video call mode or a photographing mode, the display 151 may additionally or alternatively display images which are associated with these modes.

A touch screen panel may be mounted upon the display 151. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile device may include one or more of such displays.

FIG. 10 further shows output unit 150 having an audio output module 152 which supports the audio output requirements of the mobile device 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile device. Typical events include call received, message received and user input received. An example of such output includes the providing of tactile sensations (e.g., vibration) to a user. For instance, the alarm 153 may be configured to vibrate responsive to the mobile device receiving a call or message. As another example, vibration is provided by alarm 153 as a feedback responsive to receiving user input at the mobile device, thus providing a tactile feedback mechanism. It is understood that the various output provided by the components of output unit 150 may be separately performed, or such output may be performed using any combination of such components.

The memory 166 is generally used to store various types of data to support the processing, control, and storage requirements of the mobile device. Examples of such data include program instructions for applications operating on the mobile device, contact data, phonebook data, messages, pictures, video, etc. The memory 160 shown in FIG. 10 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile device. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Mobile device 100 may be implemented in a variety of different configurations. Examples of such configurations include folder-type, slide-type, bar-type, rotational-type, swing-type and combinations thereof. For clarity, further disclosure will primarily relate to a slide-type mobile device. However such teachings apply equally to other types of devices.

The mobile device 100 of FIG. 10 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, farther description will relate to a CDMA communication system, but such teachings apply equally to other system types.

Figure 11:
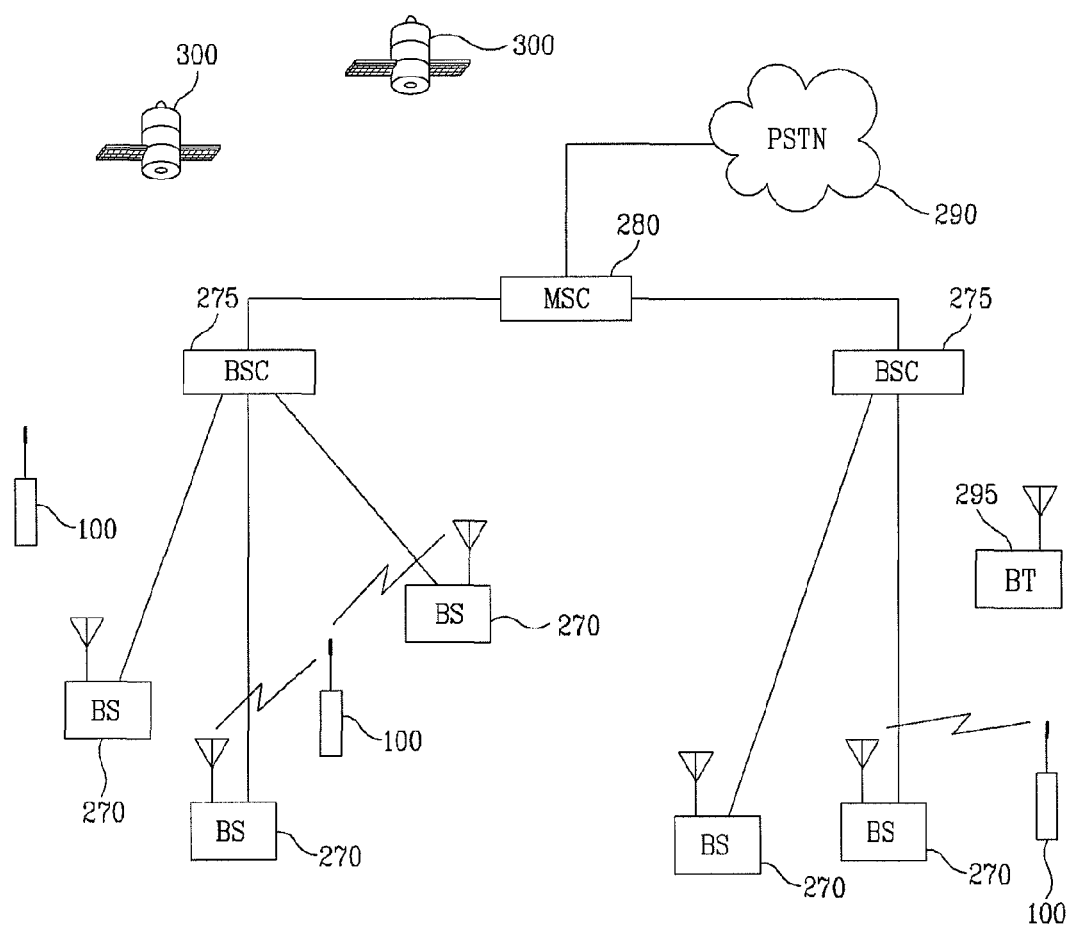
FIG. 11 is a block diagram of a CDMA wireless communication system operable with the mobile device of FIG. 10.

Referring now to FIG. 11, a CDMA wireless communication system is shown having a plurality of mobile devices 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable devices 100 operating within the system. The broadcast receiving module 111 (FIG. 10) of the portable device is typically configured to receive broadcast signals transmitted by the DMB transmitter 295. Similar arrangements may be implemented for other types of broadcast and multicast signaling (as discussed above).

FIG. 11 further depicts several global positioning system (GPS) satellites 300. Such satellites facilitate locating the position of some or all of the portable devices 100. Two satellites are depicted, but it is understood that useful positioning information may be obtained with greater or fewer satellites. The position-location module 115 (FIG. 10) of the portable device 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile devices 100. The mobile devices 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile devices 100.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A user interface method for a display device including a touch screen, comprising:
    displaying a menu, including a plurality of menu elements, on the touch screen;
    detecting a first touch over one of the displayed plurality of menu elements, including detecting a corresponding first touch characteristic;
    enlarging the touched menu element in response to the detected first touch characteristic while displaying but not enlarging an untouched menu element of the displayed plurality of menu elements;
    detecting a second touch over the enlarged menu element, including detecting a corresponding second touch characteristic; and
    displaying, within a corresponding touched menu element area and in response to the second touch characteristic, a sub menu icon associated with the touched menu element,
    wherein the step of displaying the sub menu icon includes
        confirming whether a movement area of the second touch exists within an enlarged menu element area,
        confirming whether a movement speed of the second touch exists within a range between a first reference speed and a second reference speed when the movement area of the second touch exists within the enlarged menu element area,
        determining a sub menu icon display speed value based on the movement speed of the second touch when the movement speed of the second touch exists within the range between the first reference speed and the second reference speed, and
        displaying the sub menu icon based on the determined sub menu icon display speed value while displaying the untouched menu element of the displayed plurality of menu elements but not displaying a sub menu icon corresponding to the untouched menu element of the displayed plurality of menu elements,
    wherein the second touch characteristic is a direction of the second touch,
    wherein the direction of the second touch comprises one of a first direction, a second direction and a third direction,
    wherein the first direction, the second direction and the third direction are different from each other, and
    wherein
        when the direction of the second touch is the first direction, the sub menu icon only represents a sub menu element that was most frequently selected by a user,
        when the direction of the second touch is the second direction, the sub menu icon only represents a sub menu element that was most recently selected by the user, and
        when the direction of the second touch is the third direction, the sub menu icon only represents a sub menu element that was previously selected as a favorite sub menu element.

2. The user interface method of claim 1, wherein
    the sub menu icon is one of a plurality of sub menu icons associated with the touched menu element, and
    the step of displaying the sub menu icon includes selecting the sub menu icon from the plurality of sub menu icons based on the second touch characteristic.

3. The user interface method of claim 1, further comprising:
    detecting an additional touch over the sub menu icon, including detecting an additional touch characteristic; and displaying, within the touched menu element area and in response to the additional touch characteristic, a second sub menu icon, the second sub menu icon being associated with the touched sub menu icon.

4. The user interface method of claim 3, wherein the additional touch characteristic and the second touch characteristic are common touch characteristics.

5. The user interface method of claim 3, wherein the additional touch characteristic is different from the second touch characteristic.

6. The user interface method of claim 1,
wherein the second touch characteristic is a flicking motion, and
wherein the step of displaying the sub menu icon includes scrolling the touched menu element and the sub menu icon in a direction of the flicking motion while not scrolling the untouched menu element of the displayed plurality of menu elements or the corresponding untouched menu element sub menu icon such that a portion of the touched menu element and a portion of the sub menu icon are displayed in the corresponding menu element area while the menu element is scrolled.

7. The user interface method of claim 6, further comprising:
detecting an additional touch over the sub menu icon, including detecting an additional touch characteristic; and one of
displaying, within the menu and in response to the additional touch characteristic, a second sub menu icon, the second sub menu icon being associated with the additionally touched sub menu icon, and
executing a function associated with the additionally touched sub menu icon.

8. The user interface method of claim 6,
wherein the movement speed of the second touch is a detected speed of the flicking motion, and
wherein the step of scrolling includes scrolling with a speed correlated to the detected speed of the flicking motion.

9. The user interface method of claim 1, the step of displaying the sub menu icon associated with the touched menu element comprising:
replacing the touched menu element within the displayed menu with the sub menu icon.

10. The user interface method of claim 1, the step of displaying the sub menu icon associated with the touched menu element comprising:
displaying the sub menu icon in an area substantially adjacent to the touched menu element within the displayed menu.

11. The user interface method of claim 1, the step of displaying the sub menu icon associated with the touched menu element comprising:
superimposing the sub menu icon over at least a portion of the touched menu element.

12. The user interface method of claim 1, the step of displaying the sub menu icon associated with the touched menu element comprising:
displaying the sub menu icon without displaying a sub menu corresponding to the touched menu element.

13. The user interface method of claim 1, further comprising:
displaying the sub menu icon without activating or executing the touched menu element.

14. The user interface method of claim 1, wherein the menu is a home menu.

15. The user interface method of claim 1, wherein the sub menu icon is one of an executable sub menu icon and a non executable sub menu icon.

16. The user interface method of claim 1, wherein the sub menu icon is an executable sub menu icon, the method further comprising:
detecting an additional touch over the sub menu icon; and
automatically executing an application associated with the touched sub menu icon.

17. An apparatus, comprising:
a display device adapted to display a graphical user interface;
a touch screen positioned over the display device; and
a processor configured to
display a menu, including a plurality of menu elements, on the touch screen;
detect a first touch over one of the displayed plurality of menu elements, including detecting a corresponding first touch characteristic;
enlarge the touched menu element in response to the detected first touch characteristic while displaying but not enlarging an untouched menu element of the displayed plurality of menu elements;
detect a second touch over the enlarged menu element, including detecting a corresponding second touch characteristic; and
display, within a corresponding touched menu element area and in response to the second touch characteristic, a sub menu icon associated with the touched menu element, wherein the processor is configured to display the sub menu icon by
confirming whether a movement area of the second touch exists within an enlarged menu element area,
confirming whether a movement speed of the second touch exists within a range between a first reference speed and a second reference speed,
determining a sub menu icon display speed value based on the movement speed of the second touch when the movement speed of the second touch exists within the range between the first reference speed and the second reference speed, and
displaying the sub menu icon based on the determined sub menu icon display speed value while displaying the untouched menu element of the displayed plurality of menu elements but not displaying a sub menu icon corresponding to the untouched menu element of the displayed plurality of menu elements,
wherein the second touch characteristic is a direction of the second touch,
wherein the direction of the second touch comprises one of a first direction, a second direction and a third direction,
wherein the first direction, the second direction and the third direction are different from each other, and
wherein
when the direction of the second touch is the first direction, the sub menu icon only represents a sub menu element that was most frequently selected by a user,
when the direction of the second touch is the second direction, the sub menu icon only represents a sub menu element that was most recently selected by the user, and
when the direction of the second touch is the third direction, the sub menu icon only represents a sub menu element that was previously selected as a favorite sub menu element.

18. The apparatus of claim 17,
wherein the second touch characteristic is a flicking motion, and
wherein the processor is configured to display the sub menu icon by scrolling the touched menu element and the sub menu icon in a direction of the flicking motion while not scrolling the untouched menu element of the displayed plurality of menu elements or the corresponding untouched menu element sub menu icon such that a portion of the touched menu element and a portion of the sub menu icon are displayed in the corresponding menu element area while the menu element is scrolled.

19. The apparatus of claim 18, wherein the processor is configured to
detect an additional touch over the sub menu icon, including detecting an additional touch characteristic; and one of
display, within the menu and in response to the additional touch characteristic, a second sub menu icon, the second sub menu icon being associated with the additionally touched sub menu icon, and
execute a function associated with the additionally touched sub menu icon.

20. The apparatus of claim 18,
wherein the movement speed of the second touch is a detected speed of the flicking motion, and
wherein the processor is configured to scroll the touched menu element and the sub menu icon with a speed correlated to the detected speed of the flicking motion.

21. The apparatus of claim 17,
wherein the second touch characteristic is a flicking motion,
wherein the processor is configured to display the sub menu icon by scrolling the touched menu element and the sub menu icon in a direction of the flicking motion while not scrolling the untouched menu element of the displayed plurality of menu elements or the corresponding untouched menu element sub menu icon.

22. The user interface method of claim 1,
wherein the second touch characteristic is a flicking motion,
wherein the step of displaying the sub menu icon includes scrolling the touched menu element and the sub menu icon in a direction of the flicking motion while not scrolling the untouched menu element of the displayed plurality of menu elements or the corresponding untouched menu element sub menu icon.

\* \* \* \* \*